Nov. 29, 1949    F. M. AUXIER    2,489,512
FLUID FLOW INDICATOR
Filed Dec. 16, 1946
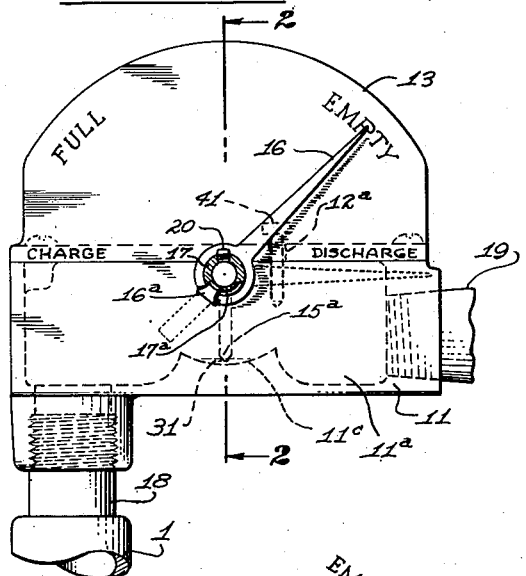
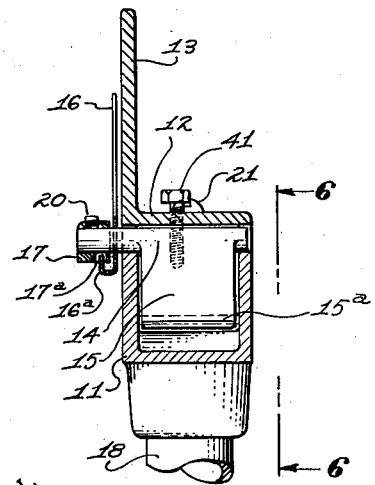
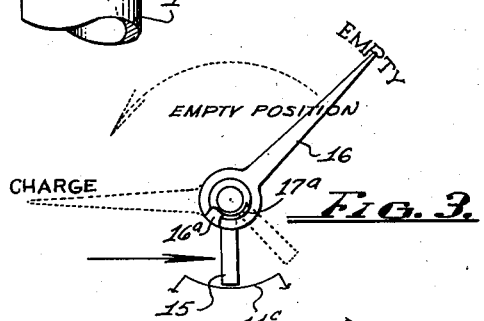
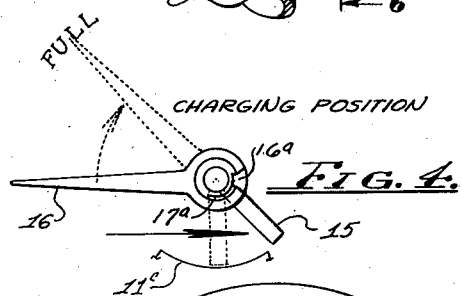
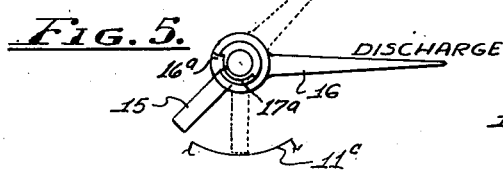
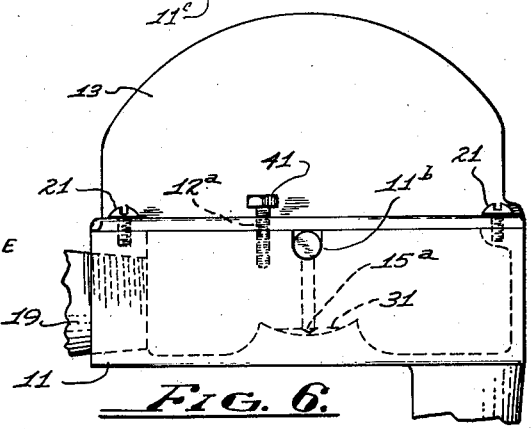
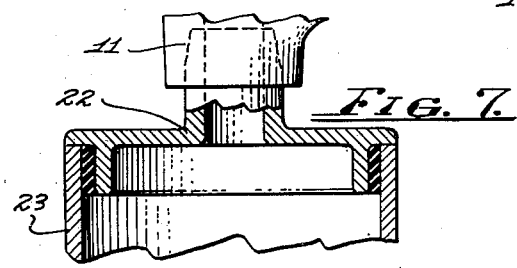
Inventor
FRANK M. AUXIER
By William E. Hall
Attorney Patented Nov. 29, 1949

2,489,512

UNITED STATES PATENT OFFICE 2,489,512

FLUID FLOW INDICATOR

Frank M. Auxier, Pasadena, Calif.

Application December 16, 1946, Serial No. 716,456

3 Claims. (Cl. 116—117)

My invention relates to an indicator for visually indicating the condition of fluid tanks, and particularly for indicating the exact operational cycle of concrete mixer water-measuring tanks.

In devices of this class, which are in use at the present time, it is difficult for the operator of the concrete mixer to ascertain exactly when the tank is full or empty. It is an important object of this invention to provide a device on a concrete mixer water tank, or the like, which is located in a suitable position visible to the operator so that he may know at all times the condition of such water tank, so that he may draw the required water therefrom or introduce more water therein.

An important object of this invention is to provide an indicator of this class which is actuated by air discharged from or entering the water-measuring device through the conventional air vent for the water tank.

An important object also of this invention is to provide a novel indicator for determining and registering the direction of flow of fluid through a fluid passage, and for registering a change of direction of such flow.

A further important object of this invention is to provide a simple and economical indicator of this class for the purpose mentioned.

With these and other objects in view, as will appear hereinafter, I have devised an indicator having certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a front view of my indicator as applied to a water tank for concrete mixers, and operated by the flow of air discharged from or entering the water tank, a portion thereof being broken away and in section to facilitate the illustration;

Fig. 2 is a sectional view thereof, taken through 2—2 of Fig. 1;

Figs. 3, 4, and 5, are diagrammatic views showing various positions of the indicator, the solid lines in each indicating a particular position, and the dotted lines indicating a changed condition;

Fig. 6 is a rear elevational view thereof, taken at 6—6 of Fig. 2; and,

Fig. 7 is a fragmentary sectional view, showing an adapter for securing my indicator to a different type of tank.

The water tank, serving as a water-measuring tank for concrete mixers, is designated 1. The portion shown is the air vent 1ª of such tank. As the tank is filled with water air is discharged from the vent 1ª, and as the water is drawn or discharged from the tank air enters the tank through the vent 1ª. This phenomenon is utilized in activating my present indicator. It is an air-flow indicator for determining the capacity and condition of the water tank.

My indicator consists of a body 11 having a longitudinal air passage 11ª, a cover 12 having a dial indicator 13 at one side, a rock shaft 14 carrying a plate valve or gauge 15, a pointer 16, and a pointer-operating collar 17.

The passage 11ª is connected at one end of the body 11 by a nipple 18 to the air vent of the water tank 1. At the opposite end of the passage may be connected a pipe 19 for protecting the air passage 11ª from foreign matter.

The rock shaft 14 extends transversely across the body 11 and lies loosely in grooves 11ᵇ at the upper portions of the side walls, as shown in Fig. 6. The plate valve or gauge 15 extends radially therefrom and normally extends downwardly by the force of gravity between the opposite side walls of the body. At the lower portion of the body is an arcuate wall 11ᶜ which is concentric with the axis of the rock shaft 14, and conforms in shape with the free edge of the valve 14 as it swings about its axis, but is spaced slightly therefrom so as to permit free movement of the valve. The length of the arcuate portion 11ᶜ is less than the distance between the extreme position of the valve when in its open position at the opposite sides of its central closed position, as indicated in Figs. 1, 3, 4, and 5. This permits the air flowing in opposite directions through the passage to pass freely between the extreme positions of the valve and the arcuate portion 11ᶜ.

The pointer 16 has a hub which is freely rotatable on the shaft 14, but is provided with an inwardly bent finger 16ª which extends into an arcuate slot 17ª at one side of the collar 17, this collar being secured to the shaft 14 by a set screw 20.

Over the upper open side of the body 11 is secured the plate 12 by means of screws 21, or otherwise, and the dial indicator 13 extends upwardly from one edge of the plate 12. The pointer 16 moves arcuately in front of the dial indicator, about the axis of the shaft 14. On the dial indicator are imprinted the words "Full" and "Empty" to indicate the approximate condition of the tank. This dial indicator also has imprinted the words "Charge" and "Discharge" which indicate to the operator when the tank 1 is being charged or discharged of water.

The arcuate slot 17ª in the collar 17 permits the finger 16ª extending thereinto to be moved approximately 60° with respect to the shaft 14, or the valve or gauge 15 secured thereto. The purpose of this will be hereinafter described.

Assuming the tank 1 to be empty and to be indicated by the solid line positions of the valve 15 and pointer 16, as in Fig. 3, the tank 1 is then filled, causing the air to be discharged from the tank and in the direction of the dotted arrow in Fig. 3. The outward flowing air causes the valve 15 to be forced to the dotted line position which permits the air to escape between the valve and the arcuate seat 11ᶜ. The pointer is carried in the same counterclockwise direction, the momentum carrying it farther than the movement of the valve itself, and the clearance provided by the arcuate slot 17ª permits the pointer to continue in its rotary movement and to be carried by gravity to the dotted line position, as shown by solid lines in Fig. 4. When the filling operation ceases, the valve assumes a downward position by reason of gravity, carrying with it the pointer to the dotted line or "full" position, shown in Fig. 4. As water is drawn from the tank, air is also drawn into the tank from the vent, causing the inrushing air to force the valve in the opposite direction, as shown by the arrow in Fig. 5, carrying with it the pointer, but causing it to be carried by momentum and gravity to the solid line position of Fig. 5. When no more water is drawn from the tank, the valve assumes a downward position, as shown by dotted lines, causing the pointer also to assume the dotted line position shown in this figure.

In order to permit connecting of my valve, the body of which is designated 11 in Fig. 7, the body is connected to an adapter 22, which permits the indicator to be connected to another tank 23 of the type shown in Fig. 7.

A sudden rush of air through the passage 11ª may cause the gate 15 to swing with considerable force in the direction of the air flow, and the momentum of the gate may cause the pointer to rebound toward the opposite of the intended position. I have therefore provided a dash-pot means to prevent such rapid movement of the gate. Such means may consist of a small quantity of oil, or other suitable liquid, 31 in the bottom of the depression of the arcuate portion 11ᶜ. This oil, or other liquid, may be introduced through a hole 12ª in the cover plate 12. The free edge of the gate is preferably chamfered slightly at its opposite sides, as indicated by 15ª, to prevent expelling of the liquid from the depression.

In the hole 12ª, which may be tapped, is a thumb screw 41 which provides a stop to check rapid swinging of the gate 15 caused by the rush of air through the passage 11ª when rapidly filling the tank with water.

I wish it to be understood that I do not desire to be limited to the exact details of construction shown and described, for obvious modifications will occur to a person skilled in the art.

I claim:

1. In a device of the character described, a body having an air passage, a dial indicator mounted on the base, a valve member pivotally mounted transversely in the passage and movable by the flow of the air therethrough from a central closed position to open positions at either side of the central position in the direction of the passage, said passage having a substantially uniform restricted portion intermediate the extreme open positions of the valve through which air may flow when the valve is in one of said open positions, the side of the restricted portion opposite the pivotal axis of the valve being radially arranged with respect to said axis and spaced from the free edge of the valve to allow free movement of the valve about its pivotal axis, and a pointer connected to the valve, the axial portion of the pointer having limited circumferential movement with respect to the axial portion of the valve, said pointer being freely movable with respect to said valve beyond the positions indicating the normal open positions of the latter.

2. In a device of the character described, a body having an air passage, a dial indicator mounted on the base, a valve member pivotally mounted transversely in the passage and movable by the flow of the air therethrough from a central closed position to open positions at either side of the central position in the direction of the passage, said passage having a substantially uniform restricted portion intermediate the extreme open positions of the valve through which air may flow when the valve is in one of said open positions, the side of the restricted portion opposite the pivotal axis of the valve being radially arranged with respect to said axis and spaced from the free edge of the valve to allow free movement of the valve about its pivotal axis, and a pointer connected to the valve, the axial portion of the pointer having limited circumferential movement with respect to the axial portion of the valve, said pointer being allowed to fall by gravity with respect to said valve beyond the positions indicating the normal open positions of the latter.

3. In a device of the character described, a body having an air passage, a dial indicator mounted on the base, a valve member pivotally mounted transversely in the passage and movable by the flow of the air therethrough from a central closed position to open positions at either side of the central position in the direction of the passage, said passage having a substantially uniform restricted portion intermediate the extreme open positions of the valve through which air may flow when the valve is in one of said open positions, the side of the restricted portion opposite the pivotal axis of the valve being radially arranged with respect to said axis and spaced from the free edge of the valve to allow free movement of the valve about its pivotal axis, and a pointer connected to the valve, the axial portion of the pointer having limited circumferential movement with respect to the axial portion of the valve, said pointer being freely movable with respect to said valve, by reason of the momentum of the latter, beyond the positions indicating the normal open positions of the latter.

FRANK M. AUXIER.

REFERENCES CITED

The following references are of record in the file of this patent:

UNITED STATES PATENTS

| Number | Name | Date |
|---|---|---|
| 868,152 | Atkinson | Oct. 15, 1907 |
| 1,848,489 | Motherwell | Mar. 8, 1932 |
| 2,311,238 | MacKinnon | Feb. 16, 1943 |

FOREIGN PATENTS

| Number | Country | Date |
|---|---|---|
| 45,398 | Austria | Dec. 10, 1910 |